(12) United States Patent
Fallon

(10) Patent No.: US 9,674,289 B2
(45) Date of Patent: Jun. 6, 2017

(54) METHOD AND APPARATUS FOR OPTIMISING TELECOMMUNICATION SERVICES

(71) Applicant: Telefonaktiebolaget L M Ericsson (publ), Stockholm (SE)

(72) Inventor: Liam Fallon, County Westmeath (IE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/783,275

(22) PCT Filed: May 9, 2013

(86) PCT No.: PCT/EP2013/059690
§ 371 (c)(1),
(2) Date: Oct. 8, 2015

(87) PCT Pub. No.: WO2014/169968
PCT Pub. Date: Oct. 23, 2014

(65) Prior Publication Data
US 2016/0072898 A1 Mar. 10, 2016

Related U.S. Application Data

(60) Provisional application No. 61/812,902, filed on Apr. 17, 2013.

(51) Int. Cl.
*H04L 29/08* (2006.01)
*H04L 12/815* (2013.01)
(Continued)

(52) U.S. Cl.
CPC .......... *H04L 67/16* (2013.01); *H04L 43/0876* (2013.01); *H04L 47/22* (2013.01);
(Continued)

(58) Field of Classification Search
CPC ... H04L 67/16; H04L 43/0876; H04M 3/4217
(Continued)

(56) References Cited

U.S. PATENT DOCUMENTS 8,893,009 B2 * 11/2014 Raleigh ................. H04M 15/00
455/557
2009/0080452 A1 * 3/2009 Ra ......................... H04L 45/00
370/419

(Continued)

FOREIGN PATENT DOCUMENTS

| EP | 1 770 918 A1 | 4/2007 |
| EP | 2 154 837 A1 | 2/2010 |
| EP | 2 375 658 A1 | 10/2011 |

OTHER PUBLICATIONS

International Search Report for Application No. PCT/EP2013/059690, mailed Jul. 23, 2013, 3 pages.

(Continued)

*Primary Examiner* — Cong Tran
(74) *Attorney, Agent, or Firm* — Nicholson De Vos Webster & Elliott LLP

(57) ABSTRACT

A method of optimizing telecommunication services for a plurality of end users of a plurality of service sessions, each service session having a priority level, the method comprising the steps of: receiving compliance measure indicating that the service experience of at least one end user is compliant, for a snapshot, with expectations of the at least one end user within a telecommunication service providing a plurality of service sessions to a plurality of end users; determining if the received compliance measure is less than a predetermined threshold; and if the received compliance measure is determined to be less than a predetermined threshold, throttling at least one of the plurality of service (Continued)

sessions, that has not been throttled and has the lowest priority level, to optimize telecommunication services.

14 Claims, 11 Drawing Sheets

(51) Int. Cl.
  *H04L 12/26*  (2006.01)
  *H04M 3/42*  (2006.01)
  *H04L 12/851*  (2013.01)
  *H04L 12/801*  (2013.01)
  *H04L 12/825*  (2013.01)
(52) U.S. Cl.
  CPC .......... *H04M 3/4217* (2013.01); *H04L 47/14* (2013.01); *H04L 47/2408* (2013.01); *H04L 47/2425* (2013.01); *H04L 47/25* (2013.01)
(58) Field of Classification Search
  USPC ...... 455/414.1, 403, 435.2, 435.3, 512, 523, 455/226.1, 226.2
  See application file for complete search history.

(56) References Cited

U.S. PATENT DOCUMENTS

| | | | |
|---|---|---|---|
| 2009/0161644 A1* | 6/2009 | Suzuki | H04W 72/10 370/341 |
| 2010/0009679 A1* | 1/2010 | Kim | H04W 60/00 455/434 |
| 2011/0149732 A1 | 6/2011 | Uzunalioglu et al. | |
| 2012/0224481 A1* | 9/2012 | Babiarz | H04L 43/0876 370/230.1 |
| 2012/0252487 A1* | 10/2012 | Siomina | H04W 24/10 455/456.1 |
| 2013/0254407 A1* | 9/2013 | Pijewski | G06F 9/5083 709/226 |
| 2013/0303165 A1* | 11/2013 | Hole | H04W 36/0055 455/435.2 |

OTHER PUBLICATIONS

Written Opinion of the International Searching Authority for Application No. PCT/EP2013/059690, mailed Oct. 17, 2015, 5 pages.

* cited by examiner

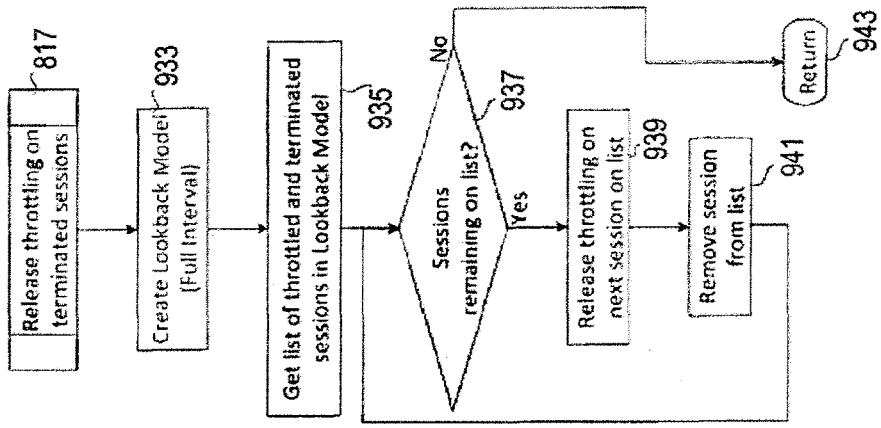
Fig. 9c
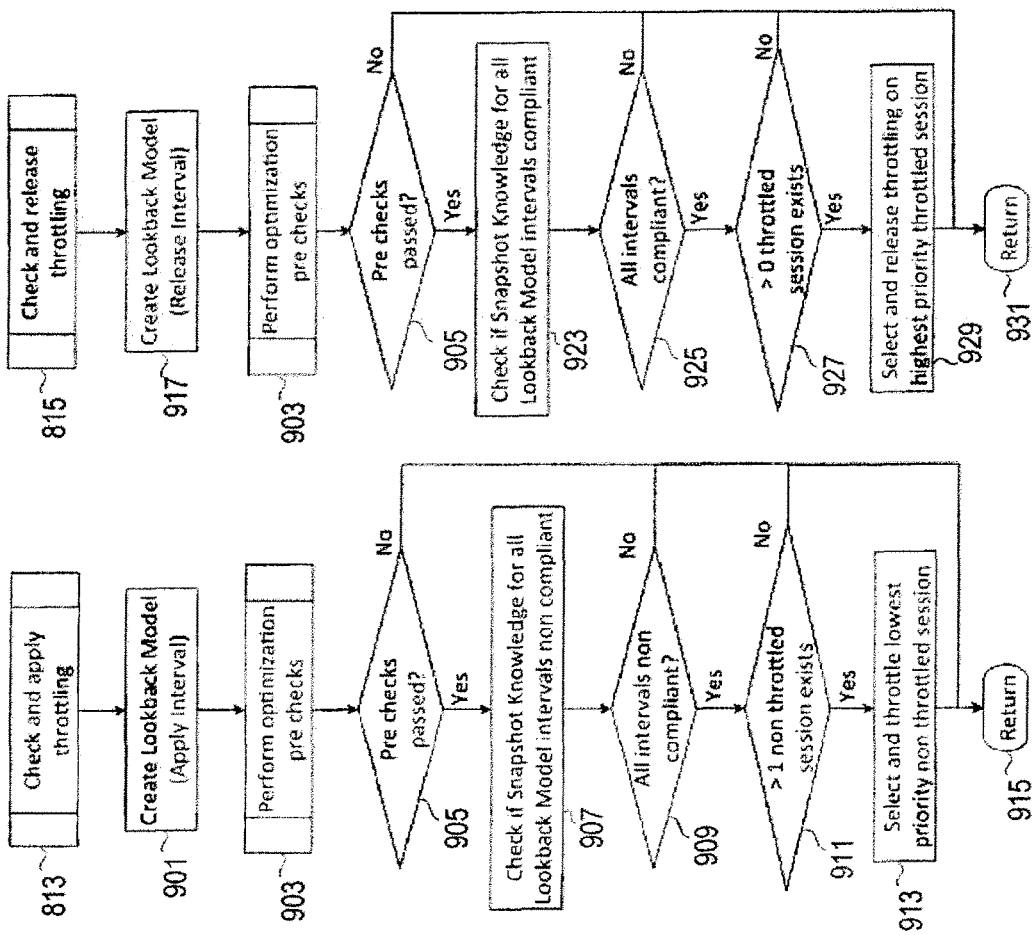
Fig. 9b
Fig. 9a

METHOD AND APPARATUS FOR OPTIMISING TELECOMMUNICATION SERVICES

CROSS-REFERENCE TO RELATED APPLICATIONS

This application is a National stage of International Application No. PCT/EP2013/059690, filed May 9, 2013, which claims priority to U.S. Application No. 61/812,902, filed Apr. 17, 2013, which are hereby incorporated by reference.

TECHNICAL FIELD

The invention relates to a method and apparatus for optimising telecommunication services. In particular, it relates to optimising telecommunication services for a plurality of end users of a plurality of service sessions.

BACKGROUND

Network operators have identified optimization as one of their top requirements Next Generation Mobile Networks (NGMN), "NGMN Top OPE Recommendations", NGMN, September 2010, for increasing operational efficiency. Oyman, O. & Singh, S., "Quality of Experience for HTTP Adaptive Streaming Services", IEEE Communications Magazine, vol. 50, no. 4, pp. 20-27, April 2012 pointed out that Quality of Experience (QoE) aware adaptation at radio and network level in mobile networks is required for end user service session optimization, and that current approaches do not address this problem. Consider an end user service session on a given User Equipment (UE) running in a cell in a Mobile Broadband Access Network. The context of that service session has three important aspects. Each cell has its own unique radio context: its physical topology, the buildings, road network, and public transport in the cell, the radio technology being used, the type of cell in question, and the current prevailing meteorological conditions. The UE context includes such factors as the distance of each UE from the base station and the type of devices in question. The active service context is the number and type of end user service sessions running in the cell at a given instant.

Therefore, context is an important factor in the optimisation of end user service delivery in mobile networks. For example, user A is experiencing excellent service quality on the Long Term Evolution (LTE) network, for example, located in a town centre. However, user B, for example, may have a poor service experience because, even though they are in an area of excellent coverage, they may be in a building or surrounded by various obstructions. A third user, user C, for example, may experience poor service quality because of a rural location far from the nearest base station. User D may also be in a rural location but may experience excellent service because of being very close to a base station.

A cell in a Mobile Broadband Access network may be considered to be a discrete Cell Wireless Network in its own right. It is delivering a set of end user service sessions with its own unique individual context. The entire Mobile Broadband Access network is considered as an aggregated network, made up of Cell Wireless Networks. End user service sessions run in a plurality of Cell Wireless Network, with the Mobile Broadband Access network controlling details of what sessions run in which Cell Wireless Network, transfer of sessions between Cell Wireless Networks, and other functions such as addressing and routing.

Optimizing end user service delivery in a Mobile Broadband Access network is much more challenging than merely monitoring and analysing end user service delivery, for example as disclosed by Sterle, J., Volk, M., Sedlar, U., Bester, J. & Kos, A., "Application-Based NGN QoE Controller", IEEE Communications Magazine, vol. 49, no. 1, pp. 92-101, January 2011. With appropriate sample design, a network wide statistical approach can be applied to monitoring and analysis, which will give a good picture of how well services are being delivered in the network as a whole as disclosed, for example, by Soldani, D., "Means and Methods for Collecting and Analyzing QoE Measurements in Wireless Networks", World of Wireless, Mobile and Multimedia Networks, 2006. WoWMoM 2006. International Symposium on a, pp. 5-pp. 535, July 2006. Indeed, with appropriate sampling, an accurate estimation of quality variations for parameters such as regions, service types, and user categories can be made, see for example, Groenendijk, J., Huang, Y. & Fallon, L., "Adaptive Terminal Reporting for Scalable Service Quality Monitoring in Large Networks", Network and Service Management (CNSM), 2011 7th International Conference on, pp. 1-5, October 2011. Approaches that estimate end user service experience to optimise end user service sessions against service expectations disclosed, for example in Sterle, J., Volk, M., Sedlar, U., Bester, J. & Kos, A., "Application-Based NGN QoE Controller", IEEE Communications Magazine, vol. 49, no. 1, pp. 92-101, January 2011 and Latré, S., Simoens, P., de Vleeschauwer, B., de Meerssche, W. V., de Turck, F., Dhoedt, B., Demeester, P., van den Berghe, S. & de Lumley, E. G., "An Autonomic Architecture for Optimizing QoE in Multimedia Access Networks", Computer Networks, vol. 53, no. 10, pp. 1587-1602, 2009, ignore the particular context in which each of those service sessions are being delivered. In order to correctly optimize end user service delivery in a Mobile Broadband Access network, experience aware optimization must be carried out at radio and network level as disclosed, for example, in Oyman, O. & Singh, S., "Quality of Experience for HTTP Adaptive Streaming Services", IEEE Communications Magazine, vol. 50, no. 4, pp. 20-27, April 2012.

In order to optimize the compliance with expectations of the set of end user service sessions running in a Cell Wireless Network, the context in which those services run may be modified. The UE context such as the position of a UE cannot be controlled by a management system. Although the radio context of a cell may be optimized to improve the bandwidth available by actions as changing antenna tilt, such actions do not operate at individual end user session level. The Quality of Service of service flows can be controlled using approaches such as the Policy Control and Charging Rule Function (PCRF) [3GPP. Policy and charging control (PCC); reference points. Technical Report 3GPP TS 29.212, 3GPP, December 2012], triggered using parameters on sessions from the radio network and packet inspection.

However, current approaches do not consider the Quality of Experience of individual sessions or the degree to which that quality of experience complies with expectations. Further, current approaches do not consider relationships between QoE across all the sessions running in a Cell Wireless Network at a given instant.

SUMMARY

The present invention seeks to obviate at least some of the disadvantages of the prior art systems and provide autonomic optimization of end user service sessions across a network.

According to an aspect of the invention, there is provided a method of optimising telecommunication services for a plurality of end users of a plurality of service sessions. Each service session has a priority level. A compliance measure indicating that the service experience of at least one end user is compliant, for a snapshot, with expectations of the at least one end user within a telecommunication service providing a plurality of service sessions to a plurality of end users is received. If the received compliance measure is determined to be less than a predetermined threshold, at least one of the plurality of service sessions, that has not been throttled and has the lowest priority level, is throttled to optimise telecommunication services.

In an embodiment, the compliance measure indicates the degree the experience of the end user complies with at least one expectation. The degree the experience complies with expectations may comprise a score. Further, the expectations may be predefined by the end user or predefined by a network operator and the priority levels may be predefined by the end user for a service type.

In an embodiment, the step of throttling at least one service session is performed if it is determined that the at least one service session is stable.

The priority level may be the relative importance of each of a plurality of service sessions provided within a cell of a network. The optimisation may be performed by a plurality of concurrent processing threads executed on separate parallel processing systems.

According to another aspect of the invention, there is provided apparatus for optimising telecommunication services for a plurality of end users of a plurality of service sessions. Each service session has a priority level. The apparatus comprises a receiver module configured to receive a compliance measure indicating that service experience of at least one end user is compliant, for a snapshot, with expectations of the at least one end user within a telecommunication service providing a plurality of service sessions to a plurality of end users; a processor configured to determine if the received compliance measure is less than a predetermined threshold; and a throttle module configured to throttle at least one of the plurality of service sessions, that has not been throttled and has the lowest priority level, if the received compliance measure is determined to be less than a predetermined threshold, to optimise telecommunication services.

In an embodiment, the apparatus further comprises an input module configured to enable the priority levels to be set by the end user for a service type.

The optimisation may be performed by a plurality of parallel, processing modules. The processing modules may comprise separate devices.

According to another aspect of the invention, there is provided a radio controller for controlling a telecommunications network. The radio controller comprises the apparatus according to the aspect above.

According to yet another aspect of the invention there is provided a telecommunications network comprising a plurality of nodes for providing a plurality of services sessions for a plurality of end users. The network comprises a monitoring module configured to receive measurements of at least one performance parameter of at least service session for analysis of the received measurements and determine the compliance measure of the service experience of at least one end user, within a telecommunication service providing a plurality of service sessions to a plurality of end users, to expectations of the at least one end user in a snapshot; a modelling module configured to create a semantic model of a plurality of concepts in the end user communication service domain; and determine the compliance measure by analysing the service defined by the created model for the snapshot; and apparatus according to the aspect above.

In this way, autonomic optimization of high priority end user service sessions is achieved. For example, high priority end user sessions running in a Mobile Broadband Access network in near real time [Next Generation Mobile Networks, NGMN, "NGMN Informative List of SON Use Cases", NGMN, April 2007].

As a result, the invention enables optimization of end user service session delivery in a network or sub network in near real time and allows the execution of that algorithm to be scaled to handle optimization of end user service sessions in large networks.

BRIEF DESCRIPTION OF THE DRAWINGS

The invention will now be described, by way of example only, with reference to the following drawings, in which:

FIGS. 9a, 9b and 9c are flowcharts of the throttling handling of the method of according an embodiment of the present invention;

DETAILED DESCRIPTION

Figure 1:
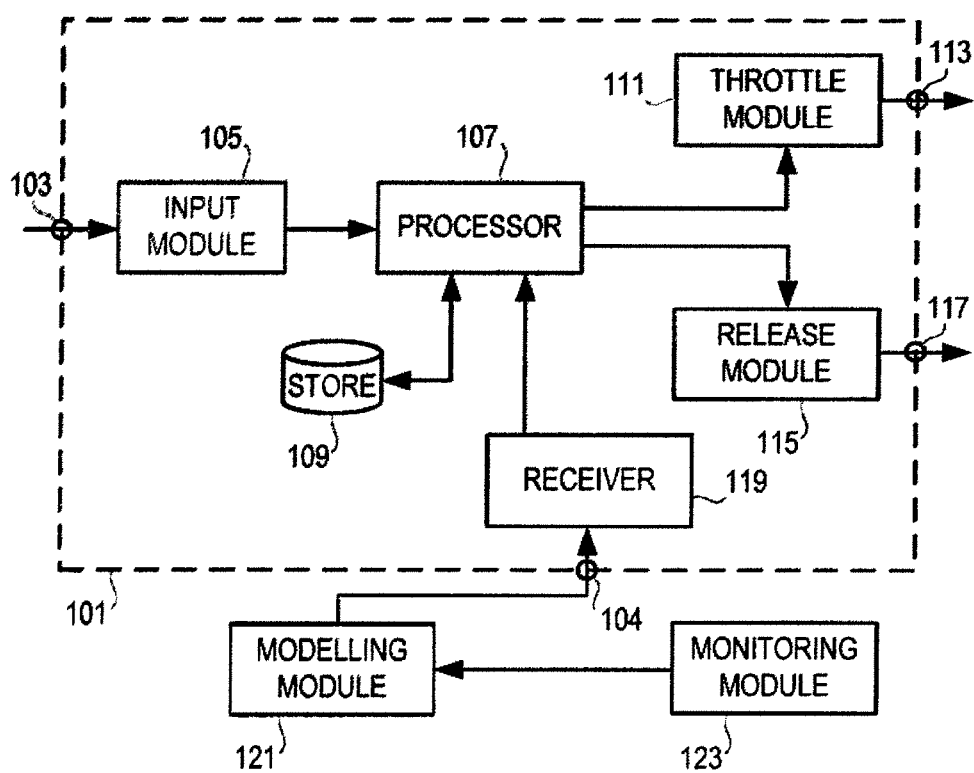
FIG. 1 is simplified schematic of apparatus of an embodiment of the present invention.

With reference to FIG. 1, the apparatus 100 for optimising telecommunication services according to an embodiment of the present invention comprises a receiver module 119 receiving the output of a modelling module 121 via a second input terminal 104. The modelling module 121 is connected to a monitoring module 123. The apparatus further comprises a processor 107. The processor 107 is connected to a storage devoice 109 which may also be connected to the modelling module 121. The outputs of the processor 107 are connected to a throttle module 111 and a release module 115. The output of the throttle module 111 is connected to a first output terminal 113 and the release module 115 is connected to a second output terminal 117. The processor 107 is also connected to an input module 105 which has an input connected to a first input terminal 103.

Figure 2:
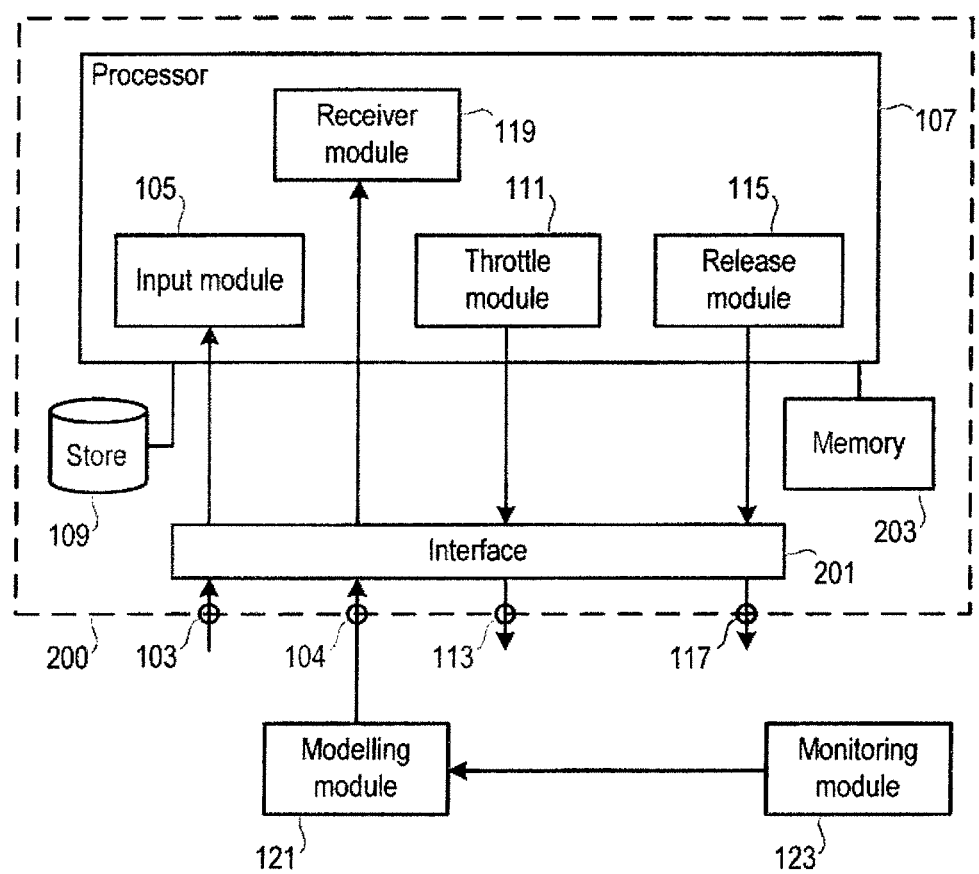
FIG. 2 illustrates an overview of the method according to an embodiment of the present invention.

Parts of the apparatus may be realised in software as illustrated in FIG. 2. The system 200 comprises an interface 201 for interconnecting the software modules of the processor 107, namely, the input module 105, the receiver module 119, the throttle module 111 and the release module 115 with the first and second input terminals 103, 104 and the first and second output terminals 113, 117 of the apparatus 100. The system comprises a memory 203 in which instructions are stored. The instructions, when executed by the processor 107, perform the operations of the various modules 105, 111, 115, 119.

Figure 3:
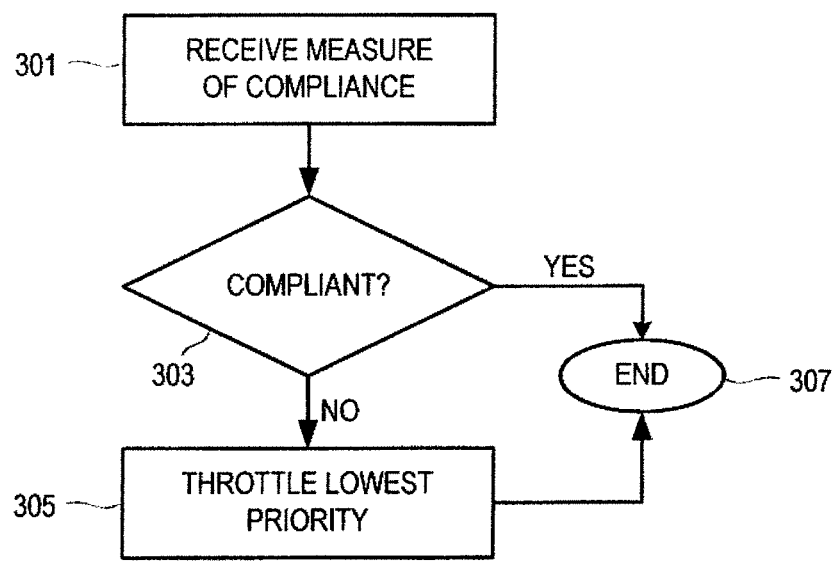
FIG. 3 is a flowchart illustrating the method according an embodiment of the present invention.

Operation of the apparatus 100 will now be described with reference to FIG. 3. A compliance measure indicating that the service experience of at least one end user is compliant, for a snapshot, with expectations of the at least one end user within a telecommunication service providing a plurality of service sessions to a plurality of end users is received, 501, on the second input terminal 104 by the receiver module 119. The received compliance measure is then processed by the processor 107 in determining, 303, if the received compliance is less than a predetermined threshold. If it is determined that the received compliance measure is less than a predetermined threshold, that is the service sessions are not compliant with the end user's expectations, at least one of the plurality of service sessions, that has not been throttled and has the lowest priority level, is throttled, 305, to optimise telecommunication services, otherwise the process ends, 307.

Figure 4:
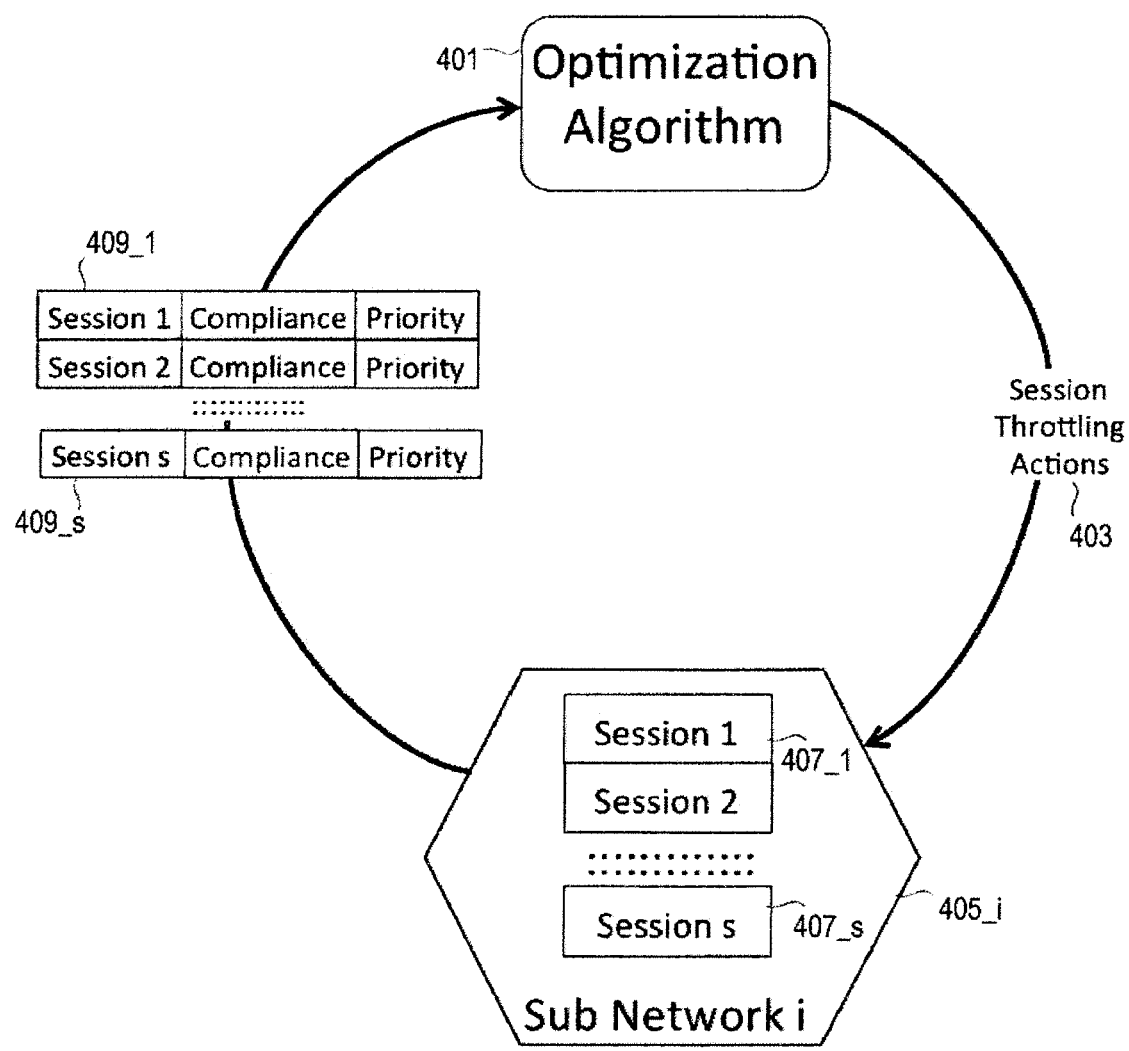
FIG. 4 is a simplified schematic of the software modules of the apparatus according to an embodiment of the present invention.

An overview of the algorithm running in the processor 107 is shown in FIG. 4. A single instance of the algorithm 401 runs for each sub-network 405_$i$ that is providing shared resources to running a plurality of end-user service sessions 407_1 to 407_$s$. A typical sub-network is a cell in a mobile access network. The compliance of the service experience of each end user session with expectations and the priority of each session 409_1 to 409_$s$ are periodically input into the algorithm 401 via the receiver module 119. The algorithm 401 also retrieves data stored in the storage device 109. When the compliance of high priority sessions with expectations is degraded, the algorithm throttles 403 lower priority sessions in the sub-network 405_$i$ via the throttle module 111 and the first output terminal 113, thus making more resources available for high priority sessions.

The compliance measure of a session is the degree to which the end user service experience of that session complies with expectations set on it by a user or a network operator. A typical expectation might be a MOS score, set to be at least 4 out of 5. An actual end user service experience MOS score of 3 on a session represents a compliance measure of 75%, that is, 75% of the expected score of 4. The priority level of a session 407_1 to 407_$s$ is the relative importance of that session with other sessions in the sub network 405, and may be set by user for each service type via the first input terminal 103 and the input module 105.

The algorithm 401 uses the compliance measure and priority level of each individual end user session 407_1 to 407_$s$ in the sub-network 405_$i$ for a certain lookback interval, input older than that lookback interval is deemed to be too old to consider in optimization determinations. The algorithm 401 performs a number of pre checks prior to optimization, as described in more detail below with reference to FIG. 11, to ensure that the service session set that is running is stable enough to optimize. It then checks if optimization is necessary and, if so, it selects a session for a throttling action.

Figure 5:
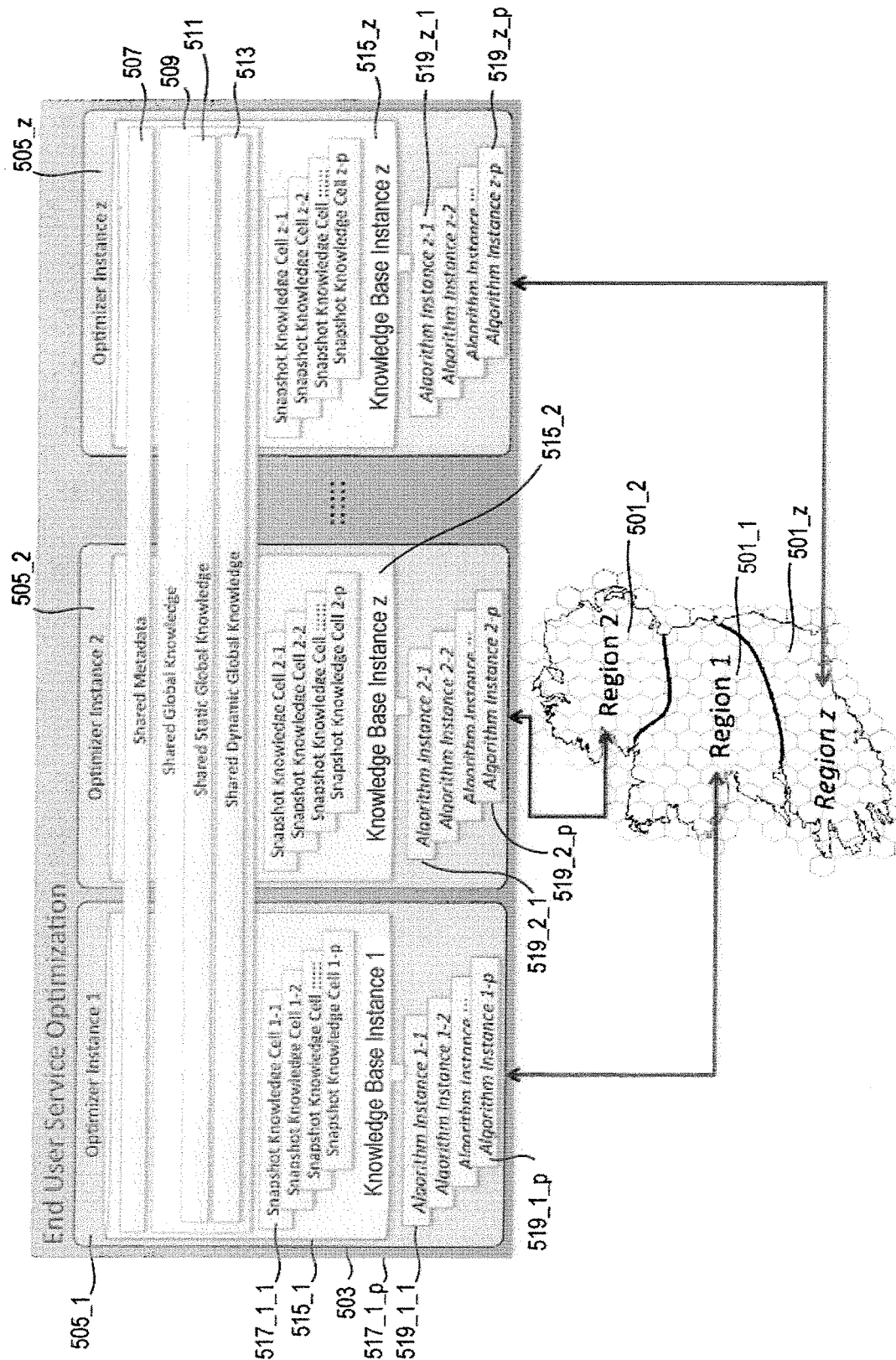
FIG. 5 illustrates regions of a mobile broadband access network optimized according to an embodiment of the present invention.

The method for scaling execution of the algorithm uses a distributed semantic model to allow instances of the algorithm to execute in separate threads and/or process on separate physical computers, as shown, for example, in FIG. 5. The telecommunication network may comprise a plurality of regions 501_1 to 501_$z$. Each region comprises a plurality of cells (or sub networks). Each region 501_1 to 501_$z$ is optimised by separate optimizer instances 505_1 to 505_$z$ of an optimiser 503. Each optimiser instance 505_1 to 505_$z$ may be executed in separate computers or a group of computers. Optimisation of service sessions of the first region 501_1 is controlled by a first optimizer instance 505_1 etc. Each of the optimiser instances 505_1 to 505_$z$ have access to shared metadata 507, shared global knowledge 509 which includes shared static global knowledge 511 and shared dynamic global knowledge 513. This shared data is created and maintained by the semantic modelling of the network performed by the modelling module 121 from outputs received from the monitoring module 123 and maintained in the storage device 109. Each optimiser instance 505_1 to 505_$z$ comprises a knowledge base instance 515_1 to 515_$z$ which is also created and maintained by the modelling module 121. The knowledge base instance 515_1 to 515_$z$ may be stored in the storage device 109. Each knowledge base instance 515_1 to 515_$z$ of each optimiser instance 505_1 to 505_$z$ provides input to a plurality of algorithm instances 519_1_1 to 519_1_$p$, 519_2_1 to 519_2_$p$ to 519_$z$_1 to 519_$z$_$p$. Each algorithm instance 519_1_1 to 519_1_$p$ of the first optimiser instances 505_1 provides optimisation to a cell (or sub network) of the first region 501_1 etc.

The distributed semantic model allows each instance 519_1_1 to 519_1_$p$ of the algorithm to access shared semantic information 507, 509, while maintaining exclusive access to its individual information. Simultaneous access operations to the distributed semantic model are guaranteed not to interfere with each other. Concurrency control is achieved using queuing and distributed transactions.

In an example usage of this invention, a network operator provides mobile broadband service in a European country on their Universal Mobile Telecommunications System (UMTS) and Long Term Evolution (LTE) mobile networks. The volume of data being carried on the network operator's Mobile Broadband Access Network has been increasing rapidly, leading to congestion. The network operator runs regular radio network optimization and network rollout projects, but traffic analysis has revealed that a certain degree of network congestion is likely to be an ongoing problem in certain cells at peak times.

The network operator is deploying optimization of end user service delivery. Customers can subscribe to four levels of Mobile Broadband service: Platinum, Gold, Silver, or the default level of Bronze. The network operator sets the service expectations and throttling levels to be applied on the Voice over Internet Protocol (IP), Web Browsing, and Video services for customers at Platinum, Gold, Silver, and Bronze level, and installs software on the smart phones of Platinum, Gold, and Silver customers. That software sends terminal reports with Quality of Service and Quality of Experience metrics on active service sessions to a system running the optimization algorithm every minute.

The algorithm disclosed herein is used to optimize the set of end user service sessions in each cell of each region individually. It uses network monitoring to determine the sessions that are running in each cell and the terminal report monitoring to determine the compliance with expectations of the sessions of Platinum, Gold, and Silver customers. When congestion occurs, the optimization algorithm progressively throttles the sessions of lower priority users, thus increasing the compliance of high priority sessions with expectations.

The optimization algorithm optimizes end user service delivery in a single Cell Wireless Network. The method for scaling execution of the algorithm disclosed herein is used to optimize end user service delivery for an entire network of the mobile network operator.

The optimization algorithm is run periodically to optimize end user service delivery in a single Cell Wireless Network. The algorithm plans optimizations and triggers execution of throttling actions to implement those optimizations. The inputs and outputs of the optimization algorithm are shown in more detail in FIG. 6. The compliance and priority of each session running in the Cell Wireless Network is collected and calculated periodically by the modelling module 121 from the output of the monitoring module 123.

Figure 6:
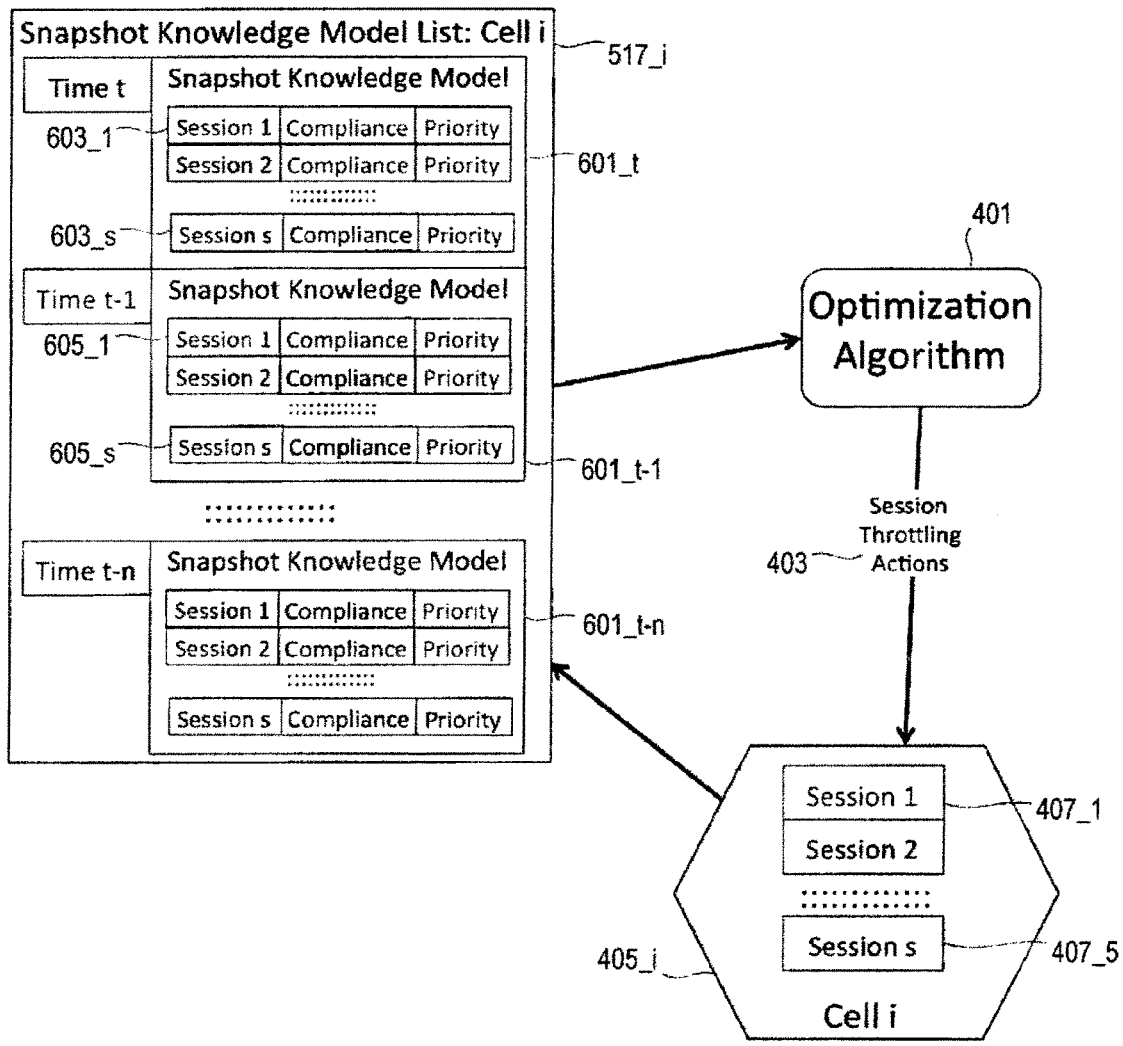
FIG. 6 illustrates the input to the method of according an embodiment of the present invention.

The Snapshot Knowledge Model list 517_*i*, shown in FIG. 6, comprises a list of a plurality of snapshot models 601_*t* to 601_*t-n*. Each model comprises a plurality of records 603_1 to 603_*s*, 605_1 to 605_*s* etc of the compliance measure corresponding to each session 407_1 to 407_*s* running in the Cell Wireless Network 405_*i* with expectations. A Snapshot Model 601_*t* to 601_*t-n* is kept for each measuring time interval t, t-1, t-n, or snapshot. The number of snapshot models retained in the system is configurable, and represents the compliance history of end user service sessions in the Cell Wireless Network.

Figure 7:
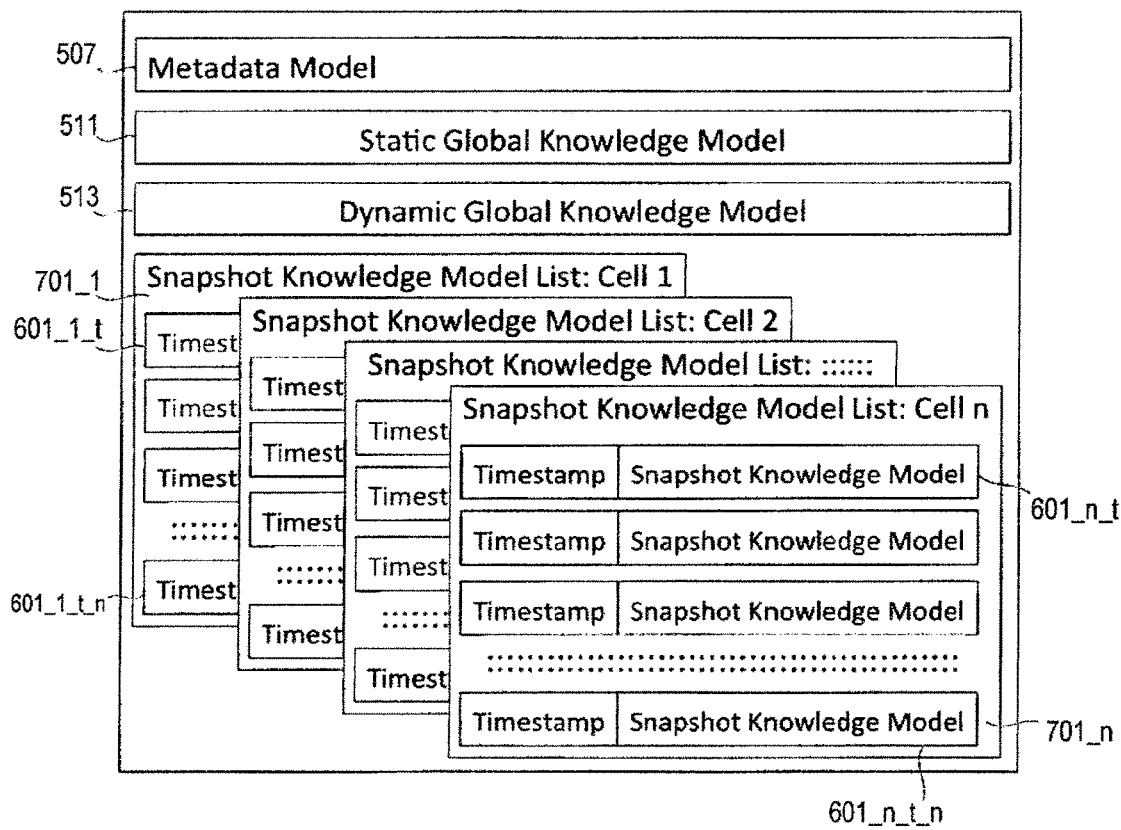
FIG. 7 illustrates the knowledge base structure for use in the method of according an embodiment of the present invention.

An optimization system can optimize more than one Cell Wireless Network by executing multiple instances of the optimization algorithm in parallel. Such a system holds multiple Snapshot Model lists, as shown in FIG. 7. For each cell of a network, there is a corresponding snapshot knowledge model list 701_1 to 701_*n*. Each list, as shown in FIG. 6, comprises a plurality of records 601_1_*t* to 601_1_*t-n*.

Figure 8A:
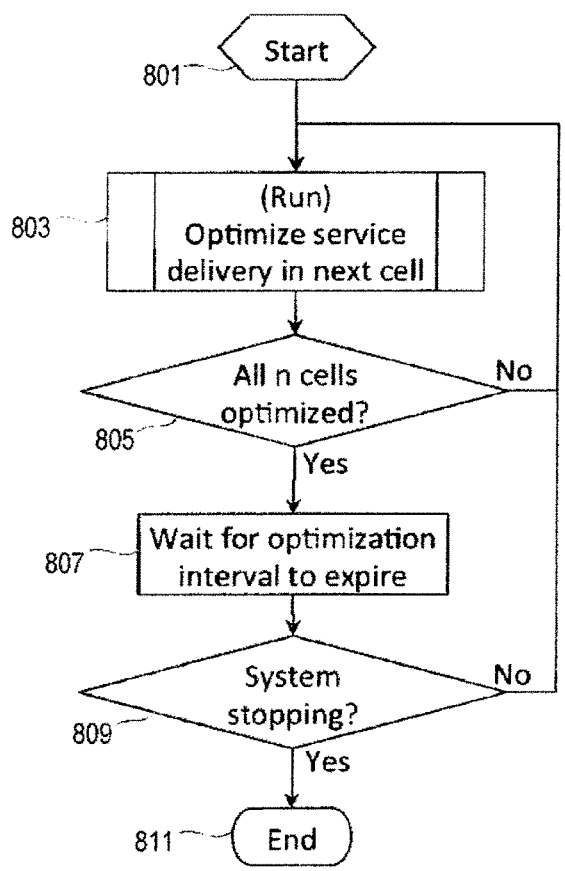
FIGS. 8a and 8b are flowcharts of main control loop and cell optimization process of the method of according an embodiment of the present invention.
Figure 8B:
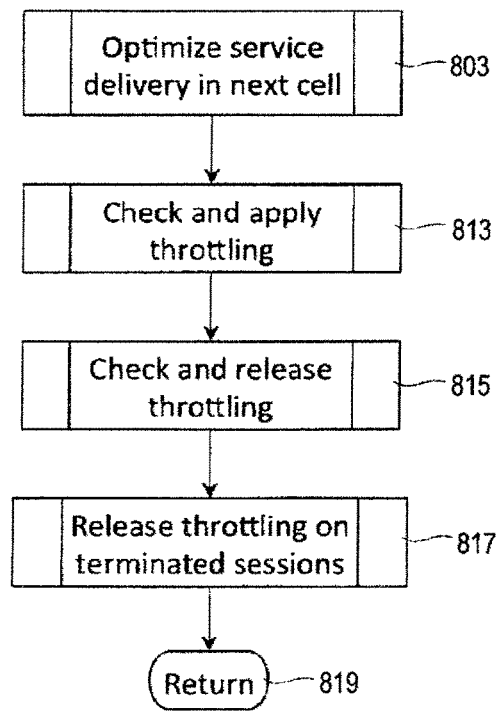

The main control loop of the optimization algorithm is shown on the left in FIGS. 8*a* and 8*b*. When the algorithm starts, 801, it starts an optimization thread, 803, for each cell, 805, in the network. Each of those threads optimizes service delivery in the cell to which it has been assigned. The algorithm then waits, 807, for the optimization interval i to elapse; the optimization interval is the frequency at which optimization operations are performed. If the system is not stopped, the algorithm continuously re-runs optimization of all cells. In an example, the optimization interval may be configured at 10 seconds.

The optimization algorithm for a single cell is shown in FIG. 8*b*. A cell optimization consists of three sub-operations, 813, 815, 817, each of which is executed in sequence. Firstly, the algorithm checks, 813, if throttling should be applied, secondly it checks, 815, if optimization should be released, and thirdly it removes, 817, throttling actions specified on any sessions that have terminated.

The sub-operations 813, 815, 817 to apply and release throttling are shown in FIGS. 9*a*, 9*b* and 9*c*. The sub-operation 801 of checking and applying throttling comprises creating, 901, a lookback model (as shown, for example, in FIG. 10) for a first lookback interval, for example, 35 seconds, i.e. at least 4 snapshot intervals are considered. Then it performs, 903, optimisation pre checks, as shown, for example, in FIG. 11. If it passes, 905, its pre checks, a check is made if the snapshot knowledge (compliance measure) for all lookback model intervals is noncompliant, 907, 909, in other words, that all intervals in the Lookback Model are degraded. The next check is performed, 911, to ensure that there are at least two non-throttled sessions available for throttling. If this check passes, the session with the lowest priority is selected for throttled and a throttling script of the throttle module is executed, 913 to apply throttling on the session. Once completed or if the pre checks fail, the apply throttle algorithm 813 the returns, 915, to perform the next sub-operation, the check and release throttling operation 815 as shown in FIG. 9*b*.

A lookback model for a second lookback interval, for example 65 seconds ensuring that seven snapshots are considered, is created, 917. As in the check and apply sub operation, 813, optimisation pre checks are performed, 903. If it passes these checks, it checks, 923, if snapshot knowledge for all lookback model intervals is compliant, in other words, that no intervals in the Lookback Model are degraded. If they are all compliant and at least one session has been throttled, 927, the highest priority, throttled session is selected and released, 929. Once completed or if it fails its pre checks, the check and release throttling sub-operation returns, 931, to perform the next sub-operation of release throttling of terminated sessions, 817 as shown in FIG. 9*c*.

Release of throttling on terminated sessions is required in order to clean up traffic controls applied to throttle sessions that no longer exist. A lookback model for a third lookback interval, specifying that the all snapshot intervals should be considered, is created, 933. Then a list of throttled and terminated sessions of the lookback model is retrieved, 935. All those retrieved are released and removed from the list, 937, 939, 941. Once the list is empty, the release throttling of terminated sessions sub-operation 817 returns, 943 to the main algorithm.

In the embodiment, the first lookback interval is less than the second lookback interval and the second lookback interval is less than the third lookback interval.

An approach such as SPARQL queries may be used to perform checks and selections on the Lookback model of the sub-operations of FIGS. 9*a*, 9*b* and 9*c*.

Figure 10:
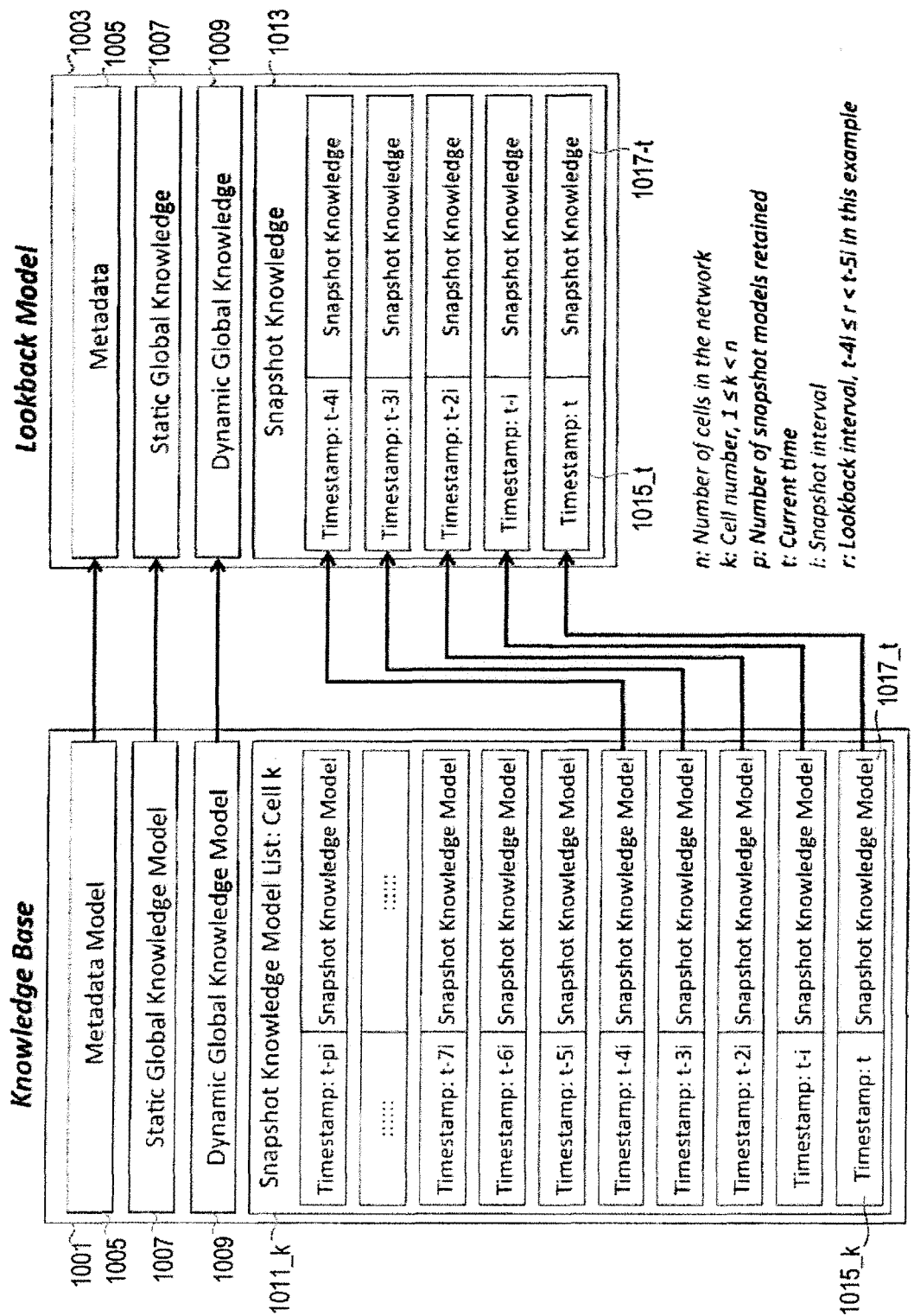
FIG. 10 illustrates the structure of a lookback model of an embodiment of the present invention.

Lookback Models are used to reduce the amount of knowledge that must be queried during optimization. A Lookback Model 1003, as shown in FIG. 10, contains all metadata 1005 and Global Knowledge 1007, 1009 of the knowledge base 1001. The lookback model 1003 also contains a subset of the snapshot knowledge 1015_*t* to 1015_*t-xi*, i.e. the last x most recent snapshots. In FIG. 10, where x=5, only 5 knowledge snapshots are contained in the lookback model 1003. It can be appreciated that any number of snapshots may be used. The number of knowledge snapshots contained in a lookback model is defined by the Lookback Interval r. For example, if the snapshot interval i is 10 seconds, and the lookback interval r is 45 seconds, then five snapshots (t [current], t-1 [10 seconds ago], t-2 [20 seconds ago], t-3 [30 seconds ago], and t-4 [40 seconds ago]) are included in the lookback model. The lookback interval is specified when the model is constructed. In effect, this means that only knowledge in the interval r will be used in decisions concerning optimization. This approach is used because only recent knowledge should affect optimizations.

Figure 11:
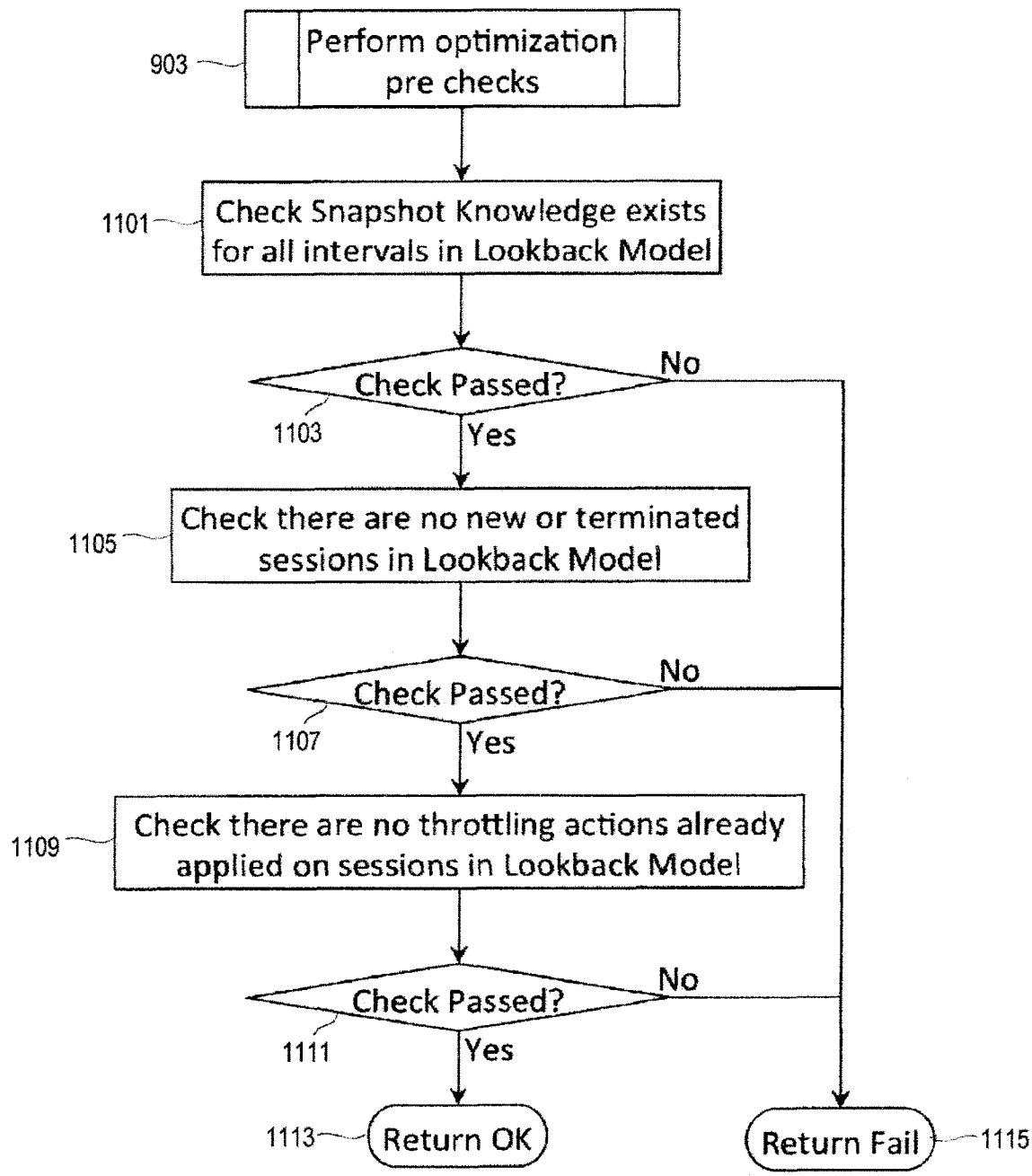
FIG. 11 is a flowchart of the optimization pre checks of the method of according an embodiment of the present invention.

The sub-operations to apply and release throttling both perform pre checks 903 that must be passed before the algorithm proceeds. The pre checks are shown in FIG. 11. Pre checks are used to ensure that the session delivery context, that is the Lookback Model, is stable prior to performing an optimization action. Pre checks may be implemented using an approach such as Special Protocol and Resource description framework Query Language (SPARQL) queries. An example of some of the pre-checks that may be performed are as follows:

Is there knowledge in the Lookback Model for every interval i in the Lookback model?, 1101, 1103. This check is performed to prevent optimization for at least the Lookback interval r when the system starts or to prevent optimizations at times when there is incomplete snapshot knowledge available.

Are there new or terminated sessions in the Lookback Model?, 1105, 1107. This check is performed to prevent optimization for at least the Lookback interval r when a new session has started or when a session has terminated. This check is used to prevent optimization during the period when the session delivery context is adjusting to the presence of a new session or the absence of an existing session.

Are there sessions on which throttling actions have been performed in the Lookback Model?, 1109, 1111. This check is performed to prevent optimization for at least the Lookback interval r when a throttling action has been performed on a session. This check is used to prevent optimization during the period when the session delivery context is adjusting to a throttling action application or removal on a session.

A network operator specifies throttling of user data in the Gateway node and/or throttling of the radio resources allocated to a UE in the Cell Wireless network and specifies the rules and parameters that should be used for throttling. Execution scripts that throttle user data send those rules to an external system such as the PCRF function in the core network or the Serving GPRS Support Node (SGSN) or MME nodes in the radio access network to modify the resource consumption of the end user session in question.

In order to optimize end user service delivery in a complete Mobile Radio Access network, it is possible to deploy multiple optimization instances. FIG. 4 shows a number of optimization instances, where each instance manages end user service delivery optimization in regions of a Mobile Radio Access network. In such a deployment, more than one optimization instance may run on a single machine, and many optimization instances may run on separate machines providing those machines are connected using high speed links with low latency, for example 10 Gbit/s optical connections.

The knowledge base is distributed across optimization instances. Metadata and global knowledge is shared across those instances. The metadata and global knowledge is held in common models for all Cell Wireless Networks being managed by an optimization instance. Static Global knowledge such as service expectations is identical across Cell Wireless Networks. Dynamic Global Knowledge such as sessions and locations of terminals are also common, because session handoff can occur from one Cell Wireless Network to another. The snapshot bucket models for each Cell Wireless Network are held in separate lists, as shown in FIG. 7.

Distributing Metadata and Static Global knowledge is straightforward. Metadata does not change, and Static Global Knowledge is changed using configuration operations that trigger a push to all optimization instances. Dynamic Global Knowledge is distributed to the Dynamic Global Knowledge model in each optimization instance using approaches such as a distributed hash table implementation like Hazelcast as disclosed by Hazelcast, "Hazelcast Documentation", Hazelcast, August 2012.

Simultaneous access operations by algorithm instances to the Knowledge Base are guaranteed not to interfere with each other. In one implementation, a distributed queuing mechanism that prevents interference by enforcing sequential access is used. Another implementation provides concurrency control using mechanisms such as transactions and locking.

As a result, optimization decisions take the actual Quality of Experience being experienced by users in real time into account to carry out optimization; the quality of experience and priority of all end user service sessions running in a networking domain are taken into account in optimization decisions; optimization of end user service sessions is carried out in near real time; the service sessions in each Cell are optimized individually; optimization actions can be applied to end user service sessions using the PCRF node; optimization actions can be applied to UE connections using commands issued to the MME and SGSN nodes; mappings, queries, and rules to monitor, analyse, plan, and execute end user services can be customized during system operation; optimization can be distributed over a number of instances running in a number of nodes, thus allowing it to scale to manage very large networks such as a full Mobile broadband Access network; and optimization can handle nesting of networks, and could be applied to other networking domains such as Digital Subscriber Line (DSL) access networks, where each Home Area Network could be considered to be a sub network.

In networks where a more distributed approach to management is taken, such as the use of Auto Configuration Servers (ACS) in management of fixed broadband access networks [Broadband Forum, 2010a], a distributed hierarchical deployment of the SSAO engine would be appropriate. Optimization instances in Home Area networks cooperating with optimization instances in ACS nodes and in a central management system would optimize end user server delivery for the network.

A number of approaches such as holding knowledge semantically, using in-memory databases or a distributed hash table disclosed by Coulouris, G., Dollimore, J., Kindberg, T. & Blair, G., "Distributed Systems: Concepts and Design", Addison-Wesley, ISBN 978-0-13-214301-1, 2012 implementation like Hazelcast e.g. Hazelcast, "Hazelcast Documentation", Hazelcast, August 2012 may be used as a knowledge repository.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of optimising telecommunication services for a plurality of end users of a plurality of service sessions, each service session having a priority level, the method comprising the steps of:

receiving compliance measure indicating that a service experience of at least one end user is compliant, for a snapshot, with expectations of the at least one end user within a telecommunication service providing a plurality of service sessions to a plurality of end users;

determining if the received compliance measure is less than a predetermined threshold; and if the received compliance measure is determined to be less than the predetermined threshold, throttling at least one of the plurality of service sessions, that has not been throttled and has a lowest priority level, to optimise telecommunication services.

2. A method according to claim 1, wherein the step of determining if the received compliance measure is less than a predetermined threshold comprises determining if the received compliance measure is less than a received compliance measure of at least one previous snapshot.

3. A method according to claim 1, wherein the method further comprises at least one of:

creating a semantic model of a plurality of concepts in an end user communication service domain, and analysing a service defined by the created semantic model for the snapshot to determine the compliance measure; and maintaining a store of the determined compliance measure for each snapshot.

4. A method according to claim 1, wherein the step of determining if the received compliance measure is less than the predetermined threshold comprises:

determining if the received compliance measure is less than the predetermined threshold for the compliance measure received for a plurality of snapshots of a first predetermined lookback interval.

5. A method according to claim 1, wherein if the received compliance measure is not determined to be less than the predetermined threshold, releasing throttle of at least one of the service sessions that has been throttled and has a highest priority level, and wherein the step of determining comprises determining if the received compliance measure is not less than a compliance measure received for a plurality of snapshots of a second predetermined lookback interval.

6. A method according to claim 1, wherein the method further comprises:

determining if at least one service session has been terminated; and if it is determined to have been terminated and throttled, releasing the throttle on the terminated service session, and wherein the step of determining if the at least one service session has been terminated comprises determining if the at least one service session has been terminated and throttled within a third predetermined lookback interval.

7. A method according to claim 6, wherein the steps of throttling, releasing throttles and releasing throttles of terminated service sessions are carried out in a sequential manner, and/or wherein the steps of throttling, releasing throttles and releasing throttles of terminated service sessions are carried out periodically.

8. A method according to claim 1, wherein the telecommunication services are provided in a cellular telecommunication network and the method optimises the telecommunication service to a plurality of end users in a plurality of service sessions within a cell, and wherein a plurality of cells of the cellular telecommunication network is divided into a plurality of cells of a region of the cellular telecommunication network, and wherein the method is performed for each region using separate parallel, processing threads.

9. Apparatus for optimising telecommunication services for a plurality of end users of a plurality of service sessions, each service session having a priority level, the apparatus comprising:

a processor; and a memory storing instructions thereon, which when executed by the processor cause the apparatus to:

receive a compliance measure indicating that service experience of at least one end user is compliant, for a snapshot, with expectations of the at least one end user within a telecommunication service providing a plurality of service sessions to a plurality of end users, determine if the received compliance measure is less than a predetermined threshold, and throttle at least one of the plurality of service sessions, that has not been throttled and has a lowest priority level, if the received compliance measure is determined to be less than the predetermined threshold, to optimise telecommunication services.

10. The apparatus according to claim 9, wherein the memory further stores instructions, which when executed by the processor, cause the apparatus to store the received compliance measure for each snapshot and to determine if the received compliance measure is less than a received compliance measure of at least one previous snapshot.

11. The apparatus according to claim 9, wherein the memory further stores instructions, which when executed by the processor, cause the apparatus to release throttle of at least one of throttled service sessions, that has been throttled and has a highest priority level, if the received compliance measure is not determined to be less than a predetermined threshold, and/or to release the throttle on a throttled service session that have been terminated.

12. The apparatus according to claim 9, wherein the telecommunication services are provided in a cellular telecommunication network and the apparatus is operative to optimise the telecommunication service to a plurality of end users of a plurality of service sessions within a cell and wherein a plurality of cells of the cellular telecommunication network are divided into a plurality of cells of a region of the cellular telecommunication network and wherein the processor comprises parallel, processing modules operative to concurrently optimise the telecommunication service to a plurality of end users for each region.

13. A radio controller for controlling a telecommunications network, the radio controller comprising:

an apparatus for optimising telecommunication services for a plurality of end users of a plurality of service sessions, each service session having a priority level, the apparatus including:

a processor, and a memory storing instructions thereon, which when executed by the processor cause the apparatus to:

receive a compliance measure indicating that service experience of at least one end user is compliant, for a snapshot, with expectations of the at least one end user within a telecommunication service providing a plurality of service sessions to a plurality of end users, determine if the received compliance measure is less than a predetermined threshold, and throttle at least one of the plurality of service sessions, that has not been throttled and has the lowest priority level, if the received compliance measure is determined to be less than the predetermined threshold, to optimise telecommunication services.

14. A telecommunications network including a plurality of nodes for providing a plurality of services sessions for a plurality of end users, the network comprising:
   a first processor;
   a first memory storing instructions thereon, which when executed by the first processor cause the telecommunications network to:
      receive measurements of at least one performance parameter of at least one service session for analysis of the received measurements and determine a compliance measure of service experience of at least one end user, within a telecommunication service providing the plurality of service sessions to the plurality of end users, to expectations of the at least one end user in a snapshot,
      create a semantic model of a plurality of concepts in an end user communication service domain, and
      determine the compliance measure by analysing a service defined by the created semantic model for the snapshot; and
   an apparatus for optimising telecommunication services for the plurality of end users of the plurality of service sessions, each service session having a priority level, the apparatus including:
      a second processor, and
      a second memory storing instructions thereon, which when executed by the second processor cause the apparatus to:
         receive the compliance measure indicating that the service experience of the at least one end user is compliant, for a snapshot, with the expectations of the at least one end user within the telecommunication service,
         determine if the received compliance measure is less than a predetermined threshold, and
         throttle at least one of the plurality of service sessions, that has not been throttled and has a lowest priority level, if the received compliance measure is determined to be less than the predetermined threshold, to optimise telecommunication services.

* * * * *